Feb. 16, 1960 J. F. GIBB 2,925,193
BOLTED TANK STRUCTURE
Filed March 26, 1956
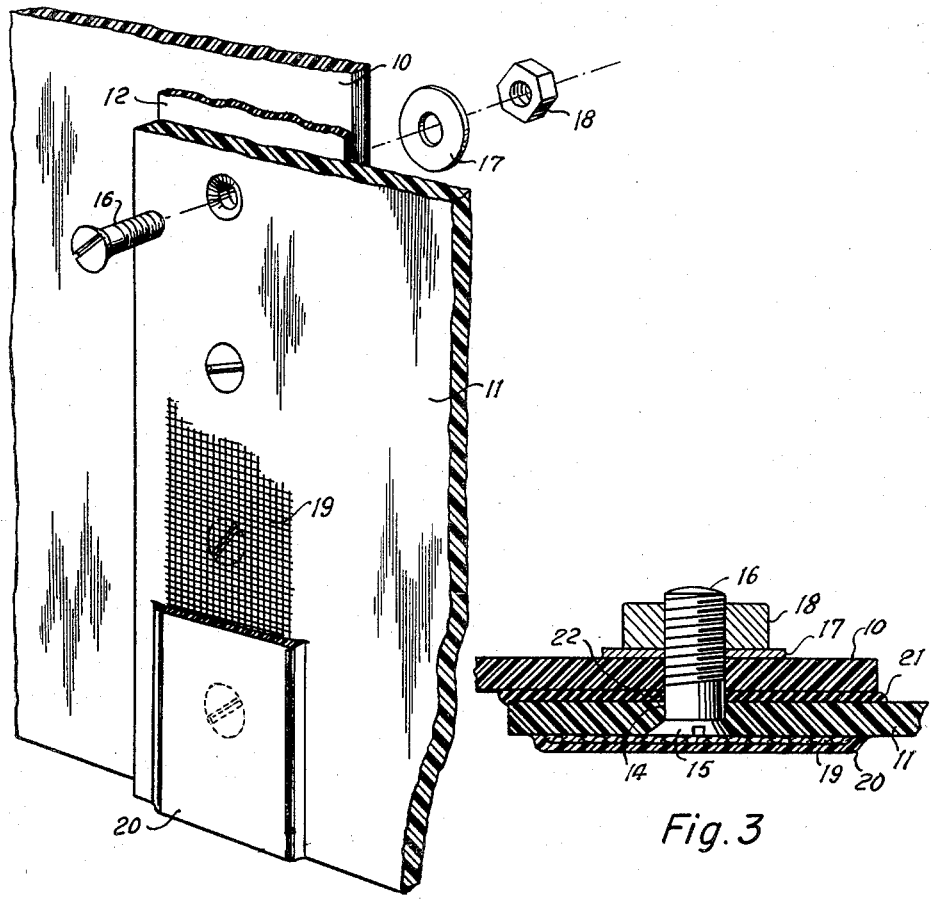
Fig. 1
Fig. 3
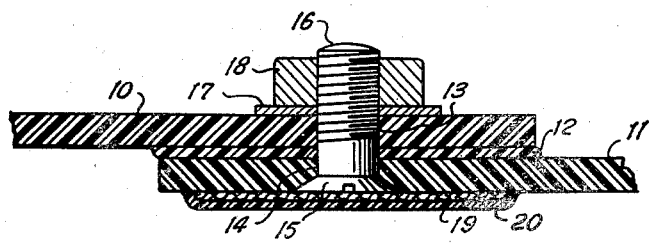
Fig. 2
INVENTOR
John F. Gibb
BY Ohley & Ohley
ATTORNEYS

United States Patent Office 2,925,193
Patented Feb. 16, 1960

2,925,193
BOLTED TANK STRUCTURE

John F. Gibb, Tulsa, Okla., assignor to National Tank Company, Tulsa, Okla., a corporation of Nevada Application March 26, 1956, Serial No. 573,840

3 Claims. (Cl. 220—81)

This invention relates to new and useful improvements in methods and means for forming the joints of bolted tanks.

The invention is particularly concerned with methods and means for forming the joints of bolted tanks formed of reinforced synthetic resin utilizing metallic fasteners in the joints with complete protection of the fasteners against the corrosive action of fluids or materials which may be present in the tank.

It is known to fabricate and erect tanks or vessels for the containing or storage of corrosive materials, such tanks being formed of reinforced synthetic resin sheets of excellent corrosion resistance. Such tanks are often of too large a size for fabrication followed by transportation to the point of use, and hence, must be erected or assembled at such point of use. Such assembling of the tank structure is conveniently carried out by the utilization of bolted joints, much in the same manner in which steel tanks are now erected or assembled at the point of use, but the utilization of metallic fastening elements in the joints of the tank or vessel reduces the corrosion resistance of the tank structure, and in many instances, substantially eliminates such corrosion resistance.

It is, therefore, one object of this invention to provide new and useful improvements in methods and means of forming the bolted joints of tanks formed of reinforced synthetic resin sheets whereby metallic fasteners may be employed for utilization of their inherent strength, and further, whereby such metallic fasteners are completely and thoroughly protected against the corrosive conditions which may exist within the vessel or tank.

A particular object of the invention is to provide a method and means of the character described in which the staves or sheets of the tank may be bonded together by a synthetic resin, or in which the joint between the staves may be closed or sealed off by a gasket formed of rubber or a rubber-like material.

Other and more specific objects will be apparent from a reading of the following specification and claims.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a fragmentary, exploded view in perspective, the view being partially broken away to illustrate the joint structure constructed in accordance with this invention and the method of fabricating such joint structure, Fig. 2 is a transverse, sectional view of the tank joint, and Fig. 3 is a view similar to Fig. 2 and illustrating a modification of the joint.

In the drawing, the numeral 10 designates the stave of a bolted tank or vessel, the stave being formed of a reinforced, synthetic resin sheet referred to hereinafter as the outer sheet since it forms the outer portion of the tank joint illustrated. The numeral 11 designates the inner sheet or stave and is similar in all respects to the sheet 10. The marginal portions of the sheets are overlapped in forming the bolted joint, and as shown in Figs. 1 and 2, a layer of synthetic resin adhesive or cement 12 desirably is positioned between the adjoining or abutting faces of the sheets 10 and 11. The layer of resin 12 may be formed of epoxy resin or of other suitable or desirable resins or adhesives of the air-drying or curing, or of the heat-drying or curing types, such resins being well known and readily available commercially. Epoxy resins are the reaction products of bis-phenol and epichlorohydrin.

The resin is desirably of a high strength type having superior bonding or adhesive properties, and the epoxy resins have been found most suitable for this purpose.

The sheet 10 is provided in its marginal portion with a bolt-receiving opening 13 registering with a similar bolt-receiving opening 14 formed in the sheet 11. The opening 14 is bevelled or chamferred at its outer end to receive the bevelled head 15 of a securing bolt 16 which extends through the openings 13 and 14. A metallic washer 17 and nut 18, or other suitable or desirable fastening and tightening means, are employed on the outer, threaded end of the bolt 16 in order to clamp the marginal portions of the sheets 10 and 11 together and close the bolted joint. At the same time, of course, the layer 12 of adhesive is urged into intimate contact and continuous engagement with the overlapping faces of the sheets 10 and 11.

To protect the inner ends of heads 15 of the securing bolts, a layer 19 of fibrous cloth, such as glass cloth, Orlon cloth, Dacron cloth, asbestos cloth, or the like, is superposed over the exposed faces of the bolt heads and covered by the layer 20 of synthetic resin which is then cured or dried and bonded into position to the surface of the sheet 11 surrounding the bolt heads 15. Here again, the resin employed may be of the air-drying or curing or of the heat-drying or curing types, epoxy resin having been found quite suitable because of its high strength and excellent bonding or adhering properties.

In the fabrication of the tank joint, the layer 12 of adhesive is applied to the marginal edge portion of one of the sheets, and the other sheet brought into position in overlapping relationship. The bolts 16 are then inserted and the nuts 18 tightened thereon to close the joint and bring the marginal portions of the sheets 10 and 11 into snug, tight engagement. The strip of fibrous cloth 19 is then laid into position being followed immediately with the layer of resin 20 to cement or bond the cloth 19 in position over the heads 15 of the bolts and to seal off the bolt heads from the interior of the tank or vessel. Radiant heating elements, heat lamps, or other suitable sources of heat, most desirably radiant heat, are then brought into position to heat the layer of resin 20 and cause the same to dry or cure. At the same time, if a heat-curing resin is used for the layer of adhesive 12, heat is applied thereto for curing of the same and bonding of the abutting marginal portions of the sheets 10 and 11. The finished joint, after curing of the resin present, has been found very strong and durable, to have at least as great strength as the sheets 10 and 11, and to be completely impervious to the action of corrosive materials which may be present within the tank or vessel.

A modified form of the invention is illustrated in Fig. 3 in which the layer 12 of adhesive is replaced with a gasket 21 formed of natural or synthetic rubber or some suitable rubber-like material. The gasket 21 is apertured at 22 for reception of the shanks of the bolts 16, and functions to seal and close off the joint between the adjoining faces of the sheets 10 and 11, as well as to protect the shanks of the bolts against the action of corrosive fluids entering into the space between the sheets 10 and 11.

In the fabrication of this modified form of the joint, the sheets 10 and 11 are arranged in overlapping position with the gasket 21 therebetween, the bolts 16 inserted into position and the nuts 18 tightened thereon. Thereafter, the procedure followed in this modification of the joint-forming process is the same as that previously described.

The novel processes of the invention result in improved joint structures for the bolted joints of tanks formed of reinforced synthetic resin sheets, the joints having strength at least as great as those of the sheets 10 and 11 and resulting in the shielding of all metallic elements whereby only synthetic resin surfaces are presented to the corrosive liquids or material present within the tank or vessel. Synthetic resin has corrosion resistance much superior to that of conventional metals, especially such metals from which common, ordinary fastening bolts, such as the bolts 16 are made. Further, in the case of the form of the invention shown in Figs. 1 and 2, the layer 12 of adhesive not only enhances the strength of the joint, but most thoroughly protects the shanks of the bolts from corrosion.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a bolted tank formed of reinforced synthetic resin sheets, a joint structure including, a pair of reinforced synthetic resin sheets having overlapping edges forming a bolted joint, a bevel-headed bolt extending through the joint and having its head countersunk in the inner face of the inner sheet of the joint, fastening means on the opposite end of the bolt, sealing means between the overlapping edges of the sheets and penetrated by the bolt, and a layer of fibrous cloth overlying the countersunk head of the bolt, and a layer of synthetic resin overlying the bolt head and the layer of fibrous cloth and bonded to the surface of the sheet surrounding the bolt head.

2. In a bolted tank formed of reinforced synthetic resin sheets, a joint structure including, a pair of reinforced synthetic resin sheets having overlapping edges forming a bolted joint, a bevel-headed bolt extending through the joint and having its head countersunk in the inner face of the inner sheet of the joint, fastening means on the opposite end of the bolt, sealing means between the overlapping edges of the sheets and penetrated by the bolt, and a layer of glass cloth overlying the countersunk head of the bolt, and a layer of synthetic resin overlying the bolt head and the layer of glass cloth and bonded to the surface of the sheet surrounding the bolt head.

3. In a bolted tank formed of reinforced synthetic resin sheets, a joint structure including, a pair of reinforced synthetic resin sheets having overlapping edges forming a bolted joint, a bevel-headed bolt extending through the joint and having its head countersunk in the inner face of the inner sheet of the joint, fastening means on the opposite end of the bolt, a gasket of rubber-like material between the overlapping edges of the sheets and penetrated by the bolt, and a layer of synthetic resin covering the head of the bolt and bonded to the surface of the sheet surrounding said bolt head.

References Cited in the file of this patent

UNITED STATES PATENTS

| | | |
|---|---|---|
| 77,859 | Allerton | May 12, 1868 |
| 1,789,642 | Wirth | Jan. 20, 1931 |
| 1,871,679 | Evans | Aug. 16, 1932 |
| 1,875,666 | Schwemlein | Sept. 6, 1932 |
| 2,159,346 | Welch et al. | May 23, 1939 |
| 2,317,734 | Cook | Apr. 27, 1943 |
| 2,495,761 | Platt | Jan. 31, 1950 |
| 2,634,017 | Moyer | Apr. 7, 1953 |
| 2,710,113 | Pritchard | June 7, 1955 |
| 2,726,009 | Murdock et al. | Dec. 6, 1955 |

FOREIGN PATENTS

| | | |
|---|---|---|
| 40,436 | France | Mar. 29, 1932 |